Aug. 27, 1963  R. A. FLOWER  3,102,264
HYBRID PULSE-CONTINUOUS WAVE DOPPLER RADIO NAVIGATION SYSTEM
Filed Dec. 22, 1961  2 Sheets-Sheet 1

INVENTOR.
ROBERT A. FLOWER
BY
ATTORNEY

United States Patent Office 3,102,264
Patented Aug. 27, 1963

3,102,264
HYBRID PULSE-CONTINUOUS WAVE DOPPLER
RADIO NAVIGATION SYSTEM
Robert A. Flower, White Plains, N.Y., assignor to General Precision, Inc., a corporation of Delaware
Filed Dec. 22, 1961, Ser. No. 161,509
12 Claims. (Cl. 343—9)

This invention relates to Doppler radio navigators suitable for use in aircraft and more particularly to hybrid pulse-continuous wave Doppler radio navigators which provide the ground track velocity of an aircraft and its drift angle.

Prior art Doppler navigation systems fall within the following three established groups; pulse Doppler, continuous wave and frequency modulated continuous wave. Each of the different types has distinct advantages over the others. However, they each have inherent limitations and, therefore, the choice of any one system over the others is a matter of choice and a trade off of advantages against disadvantages.

The pulse Doppler systems provide excellent transmitter receiver isolation, however, they are inefficient since the transmitter has a very low duty cycle. On the other hand pure continuous wave systems while very efficient due to the 100% duty cycle of the transmitter have very poor transmitter-receiver isolation. In addition they are troubled by reflections from nearby objects.

Frequency modulated continuous wave systems attempt to combine some of the advantages of both pulse and continuous wave systems. These systems solve the receiver transmitter isolation problem and the problem of discrimination against nearby objects, present in pure continuous wave systems, on a frequency basis which bears a close resemblance to the time basis solution of these problems in a pure pulse system.

However, frequency modulated continuous wave systems employ receivers which necessarily accept and use only the Doppler shift of one preselected higher order sideband of the beat between the received and the transmitted signals. This results in a relatively low spectrum utilization efficiency with respect to pure continuous wave systems since the power in the zero order sideband and all of the other higher order sideband is wasted for all practical purposes.

The novel hybrid pulse-continuous wave Doppler system disclosed herein is, like the frequency modulated continuous wave systems, in part a combination of both pulse and continuous wave systems, however, unlike the frequency modulated continuous wave systems it retains the high efficiency inherent in the pure continuous wave systems in addition to the excellent receiver transmitter isolation of the pure pulse systems.

Briefly stated, the invention utilizes a novel automatic frequency controlled microwave generator which alternately supplies two microwave frequencies, $f_1$ and $f_2$, which are alternately transmitted toward the ground. The reflected radiation is received with the Doppler frequency superposed thereon. In this respect, $f_1$ from the generator is transmitted during the first half of the first cycle of operation and is, due to the Doppler effect, altered to $f_1 \pm \Delta f$, where $\Delta f$ is the well known Doppler shift. This frequency is mixed during the second half cycle of operation with $f_2$ to secure $f_2 \pm (f_1 \pm \Delta f)$. At the same time $f_2$ is transmitted and during the first half cycle of the second cycle of operation $f_2 \pm \Delta f$ is mixed with $f_1$ to secure $f_1 \pm (f_2 \pm \Delta f)$. Both of outputs from the mixer may be quantitatively reduced to $f_2 - f_1 \pm \Delta f$. Thus it is seen that a single intermediate frequency (equal to $f_2 - f_1$) with the Doppler shift impressed thereon is produced.

The novel system, like pure pulse and frequency-modulated continuous wave systems, is subject to altitude holes. However, it is susceptible to correction in the same manner as pure pulse and frequency modulated continuous wave systems.

One object of this invention is to provide a novel Doppler navigation system which is comparable in efficiency to continuous wave Doppler navigators.

Another object of the invention is to provide a novel Doppler navigation system which has receiver-transmitter isolation comparable to a pure pulse Doppler navigator.

A further object of this invention is to provide a novel microwave generator which alternatively supplies two microwave frequencies.

Another object of this invention is to provide apparatus for producing a microwave signal which is periodically frequency modulated in a square-wave manner between two selected microwave frequencies.

Yet another object of this invention is to provide apparatus for producing a square-wave frequency-modulated microwave signal whose frequency excursion is automatically frequency controlled.

The foregoing and other objects and advantages of the invention will be more apparent from a consideration of the specification and drawings wherein one embodiment of the invention is shown and described for illustration purposes only.

Figure 1:
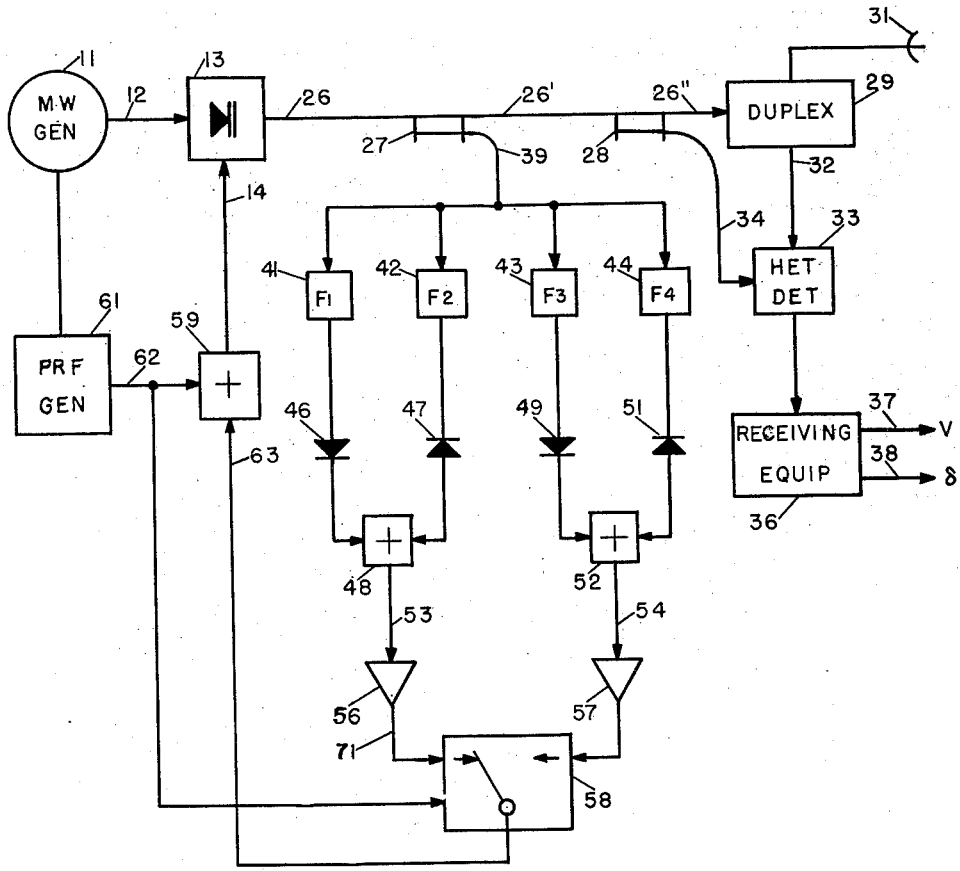
FIGURE 1 is a schematic diagram showing an embodiment of the invention.

Referring now to FIGURE 1, an airborne microwave oscillator 11 consists of a magnetron the output of which is applied through a waveguide 12. A variable capacitance diode 13 controled by a direct potential applied from the conductor 14 presents an adjustable capacitive load susceptance to the magnetron. The magnetron oscillation frequency can thereby be controlled by the magnitude of the capacitance, via the "pulling figure" of the magnetron.

Figure 2:
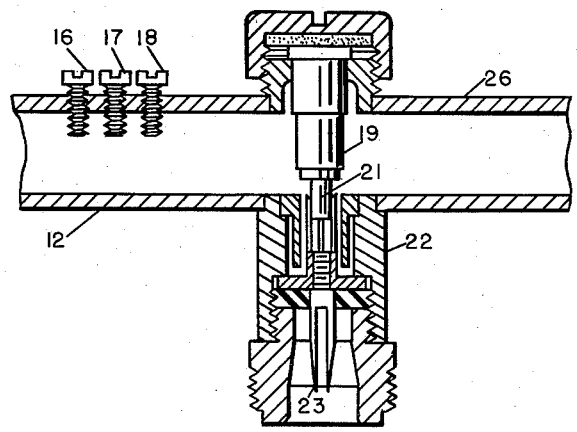
FIGURE 2 is a cross-section of a waveguide and holder for a diode having a voltage-controlled capacitance; and, FIGURES 3 and 4 are graphs illustrating operation of the invention.

The construction of the holder of the variable capacitance diode 13 and of the associated waveguide and tuning component are shown in FIGURE 2. The waveguide 12 for coupling the magnetron to the variable capacitance diode is provided with a three-stub tuner consisting of the three capacitance screws 16, 17 and 18, positioned ⅛ wavelength apart in the centerline of one broad face of the waveguide 12. An assembly 19 similar to a diode mixer crystal cartridge contains the variable capacitance diode, and is conventionally secured through one waveguide broad face at its center line. The terminal 21 of the diode is secured to a fitting 22 suitable for attaching a coaxial cable. The low-frequency conductor 14, FIGURE 1, is connected to the coaxial center terminal connector, 23, FIGURE 2. The D.-C. return for the diode is through its metallic base, which is in direct contact with the waveguide.

The microwave output at the waveguide 26, FIGURE 1, is applied through the main channels of two directional couplers 27 and 28 to a duplexing circuit 29. A microwave transmitting and receiving antenna, 31, is connected to the duplex terminal of duplexing circuit 29. Alternatively, so-called space duplexing may be employed, using separate transmitting and receiving antennas and dispensing with the duplexing circuit in a manner well understood by those skilled in the art. The receiving terminal 32, of the duplexing circuit 29 applies radar echo signals from the antenna 31 to a detector 33 of the heterodyne type. This detector receives, as its heterodyne input, through the waveguide 34 a small amount of the transmitting energy secured through the directional coupler 28. Alternatively, leakage of transmitting energy through the duplexing circuit 29 into the detector 33 may be adequate for heterodyning the detector signal, thus permitting omission of the explicit heterodyning input waveguide 34. The output of detector 33, containing an intermediate frequency carrier and Doppler information, is converted in receiving equipment 36 into a signal in output 37 representing aircraft speed relative to the earth and another signal in output 38 representing aircraft drift angle.

Similar receiving equipment for the conversion of Doppler information into speed and drift signals is fully described in Patent No. 2,915,748, entitled Microwave Drift Sight and Speed Indicator.

The output in waveguide 39 of the directional coupler 27, having an energy of about four milliwatts, is applied to the inputs of four resonant microwave cavities 41, 42, 43 and 44 connected in parallel. The outputs of the cavities 41 and 42 are connected to two diode rectifiers, 46 and 47, oppositely poled and having their outputs connected together at a summing circuit, 48, the output of which is a direct current representing by its magnitude the algebraic sum of the outputs of the diodes 46 and 47. Similarly, the oppositely-poled diodes 49 and 51 apply their direct-current outputs of opposite polarities to a summing circuit 52 which generates a direct current representing the algebraic sum of the direct-current outputs of diode detectors 49 and 51.

The two sum currents in conductors 53 and 54 are amplified in amplifiers 56 and 57 and applied to two terminals of an electronic switch 58 having single-pole double-throw characteristics. Such a switch is described by M. Bloom in an article entitled Microwave Switching with Computer Diodes, in the January 15, 1960, issue of the magazine Electronics, on pages 85–87. The switch arm contact is connected through a summing circuit 59 and conductor 14 to the control terminal of the voltage controlled diode 13.

A pulse repetition frequency generator 61 generates a 25 kc.p.s. square waveform potential at conductor 62, which is connected to the summing circuit 59 and also to the actuating terminal of the electronic switch 58.

In the operation of the circuit of FIGURE 1, let it be assumed initially that the summing circuit 59 receives input only from conductor 62 and none from conductor 63. Also assume that the square-wave potential at 25 kc.p.s. applied by conductor 14 to the diode 13 so changes its capacitance as to change the frequency of oscillation of the magnetron 11 by 10 mc.p.s., and that this change is ideally from 8800 mc.p.s. to 8790 mc.p.s. thus the signal in the waveguide 26 alternates between these two frequencies at 25 kc.p.s.

Figure 3:
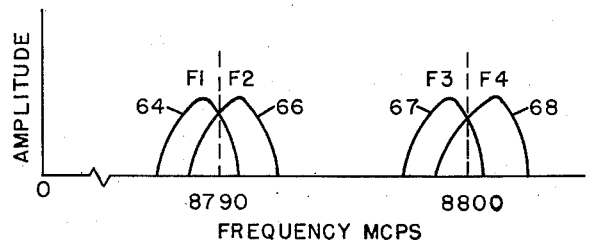

These frequencies are automatically held constant, notwithstanding possible drift of the magnetron of several megacycles. The resonant cavities 41 and 42 are tuned to the frequencies $f_1$ and $f_2$ which bracket the lower microwave frequency of 8790 mc.p.s., and the resonant cavities 43 and 44 are tuned to the frequencies $f_3$ and $f_4$ which bracket the upper microwave frequency of 8800 mc.ps. The resonant transmission bands of these four cavities, serving as filters, are shown in FIGURE 3 by the response curves 64, 66, 67 and 68 respectively. The crossover of the response curves centered at $f_1$ and $f_2$ is preferably at the half power, or 3 db point. The same is true for the response curves centered at $f_3$ and $f_4$. The diodes 46, 47, 49 and 51 respectively convert the transmitted signals to direct currents representing the signal amplitudes. For example, if the lower frequency applied to filters 41 and 42 is at exactly 8790 mc.p.s. frequency, the output amplitudes will be equal, producing equal positive and negative signals from the rectifiers 46 and 47. Their algebraic sum being zero, the output in conductor 53 is zero. However, if for example, the frequency is less than 8790 mc.ps. by a small amount, the positive signal applied to the summing circuit 48 by diode 46 will be greater than the negative signal applied by diode 47, and a positive potential will be applied through amplifier 56 and switch 58 to conductor 63.

Figure 4:
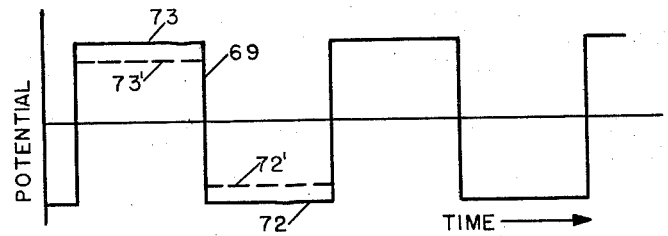

FIGURE 4 represents, by the full line 69, the output of PRF generator 61 applied through conductor 62 to the summing circuit 59 and through it to control the capacitance of the diode 13. The same signal is applied to the switch 58 in such phase as to connect the conductor 71 to conductor 63 during the nominally 8790 mc.p.s. half cycles of output of diode 13. These half cycles are assumed to coincide with the lower half cycles 72 of the graph of FIGURE 4, and the other half cycles, nominally at 8800 mc.p.s., are assumed to coincide with the positive half cycles 73 of FIGURE 4. If now during the lower half cycle 72 the microwave frequency is less than 8790 mc.p.s., positive potential is added in summing circuit 59 to the PRF generator output and the net potential in conductor 14 will be changed from that shown by the solid line 72 to the value shown by the dashed line 72'. This will accordingly increase the frequency in waveguide 26 during the lower half cycles until an appropriate part of the error signal is neutralized, holding the lower frequency close to 8790 mc.p.s.

Similarly, if the upper frequency of 8800 mc.p.s. should increase, the output from the filter 44 will exceed that from filter 43, causing a negative error signal at the summing circuit output conductor 54. This being applied to the summing circuit 59 during positive half cycles 73, causes reduction of potential to the value 73', in turn causing reduction in the upper frequency.

Thus the frequency modulation limits of excursion of the transmitted microwave frequencies are held closely to 8800 and 8790 mc.p.s. If frequency variations are caused by wandering of the magnetron frequency, the upper and lower residual errors will be of the same sign and the resulting residual error in the 10 mc.p.s. separation becomes a secondary error.

The frequency-modulated microwave signal in waveguide 26' makes possible a Doppler system which dispenses with the usual local oscillator. Such a system provides all of the advantages of both a continuous wave and a pulse system and has been identified as a hybrid, pulse-continuous wave system because the transmitting generator 11 operates continuously; however, the signal received at a specific microwave carrier frequency is pulsed.

This system may be used for Janus operation of an aircraft navigation system. The airborne antenna 31 emits several beams, one or more being aimed forward, toward or near the earth track and another being simultaneously aimed toward the rear, toward or near the earth track. The received signals will be modified in frequency by the Doppler shifts, and when beat together will contain Doppler information.

In operation, during a half cycle of microwave energy at the frequency of 8800 mc.p.s. in waveguide 26''. beams at this frequency are radiated from the antenna 31. When their echoes containing Doppler information are received a time interval equal to the travel time to and from the earth has elapsed, and at least part of the echo is received after the frequency in waveguide 26' has changed to 8790 mc.p.s. A small amount of signal from waveguide 26' at 8790 mc.p.s. is applied to the detector 33 through the directional coupler 28 to form a detected signal having a carrier frequency of 8800–8790 or 10 mc.p.s. and containing the Doppler information. A similar action occurs during the next one-half cycle of the PRF generator, when the echo signal frequency containing Doppler information is nominally at 8790 m.c.p.s. and the heterodyning frequency is 8800 mc.p.s. Thus a continuous signal at 10 mc.p.s. carrier is applied to the receiving equipment 36. This signal is amplified and demodulated, and the Doppler information is applied to generate speed and drift angle signals in a manner well understood by those skilled in this art and described in detail in the aforementioned U.S. Patent No. 2,915,748.

While only one embodiment of this invention has been shown and described in detail for illustration purposes only, it is to be expressly understood that the invention is not limited to that specific embodiment.

What is claimed is:

1. A frequency-modulated microwave generator comprising, a microwave oscillator, control means for periodically varying the frequency of the oscillator output from a first to a second value, means responsive to said varying oscillator output for alternately driving the microwave oscillator output to a first and a second predetermined frequency.

2. A frequency-modulated microwave generator comprising, a microwave oscillator, control means for periodically varying the frequency of the oscillator output from a first to a second value, means responsive to said varying oscillator output for providing signals indicative of the instantaneous frequency deviations of the oscillator output from first and second predetermined reference frequencies, means responsive to the said outputs and to the said control means for periodically applying the said outputs to the said control means to alternately drive the microwave oscillator to the said first and second predetermined frequencies.

3. A frequency modulated microwave generator comprising, a microwave oscillator, control means for cyclically changing the frequency of the oscillator output from a first to a second value, first means responsive to said cyclically changing oscillator output for providing a signal indicative of the instantaneous frequency deviations of the oscillator output from a first predetermined reference frequency, second means responsive to said cyclically changing oscillator output for providing a signal indicative of the instantaneous frequency deviations of the oscillator output from a second predetermined reference frequency, and means responsive to the output from said first and second means and to the control means for cyclically applying the outputs from said first and second means to the control means to alternately drive the microwave oscillator to the said first and second predetermined frequencies.

4. A frequency modulated microwave generator as set forth in claim 3 in which the first and second means responsive to the cyclically changing oscillator output each include, two resonant microwave cavities responsive to the microwave generator output, said cavities having transmission bands which crossover at the predetermined reference frequency, oppositely poled rectifiers connecting the outputs of said resonant microwave cavities to a summing network which provides a direct-current voltage for indicating the magnitude of the frequency deviation of the input signal from the said crossover point and the polarity of said voltage indicating the direction of the deviation.

5. A frequency modulated microwave generator as set forth in claim 3 in which the control means for cyclically changing the frequency of the oscillator output from a first to a second value includes, a voltage variable capacitance means connected to the output of the microwave generator and means for cyclically impressing two different voltages on said voltage variable capacitance means to cyclically vary the capacitive reactance of the said means from a first to a second value which varies the frequency output of the microwave oscillator from a first to a second value.

6. A frequency modulated microwave generator comprising, a microwave oscillator having an output, a voltage variable capacitance means connected to the output of said oscillator, a square-wave generator, means for applying the output from said square-wave generator to the voltage variable capacitance means for varying the capacitive reactance of said means which varies the frequency of the oscillator output from a first to a second value, means responsive to said varying oscillator output for providing signals indicative of the instantaneous frequency deviations of the oscillator output from first and second predetermined reference frequencies, means responsive to the outputs indicative of the instantaneous frequency deviations of the oscillator output from the said first and second predetermined frequencies and to the square-wave generator for periodically applying the said outputs to the voltage variable capacitance means for driving the microwave oscillator to the said first and second predetermined frequencies.

7. A frequency modulated microwave generator as set forth in claim 6 in which the means responsive to the varying oscillator output for providing signals indicative of the instantaneous frequency deviations of the oscillator output from first and second predetermined reference frequencies comprises, a first pair of resonant microwave cavities having transmission bands which crossover at the first predetermined frequency, a second pair of resonant microwave cavities having transmission bands which crossover at the second predetermined reference frequency, first rectifying means for combining the outputs from the first pair of resonant microwave cavities to provide a signal the magnitude and polarity of which indicate the deviation of the oscillator frequency from the said crossover frequency, second rectifying means for combining the outputs from the second pair of resonant microwave cavities to provide a signal the magnitude and polarity of which indicate the deviation of the oscillator frequency from the said crossover frequency, and switching means controlled by said square-wave generator for alternately applying the output from said first and second rectifying means to the voltage variable capacitance means.

8. A Doppler radio navigator comprising, a microwave oscillator, control means for periodically varying the frequency of the oscillator output from a first to a second value, means responsive to said varying oscillator output for alternately driving the microwave oscillator output to a first and a second predetermined frequency, duplexing means for connecting the microwave oscillator output to an antenna and for connecting the received reflected energy from said antenna to a mixing means, means for connecting the microwave oscillator output to said mixing means, and a Doppler receiver responsive to the output from said mixing means for providing the velocity of the antenna along its ground track and drift angle thereof.

9. A Doppler radio navigator comprising, a microwave oscillator, control means for periodically varying the frequency of the oscillator output from a first to a second value, means responsive to said varying oscillator output for providing signals indicative of the instantaneous frequency deviations of the oscillator output from first and second predetermined reference frequencies, means responsive to the said outputs and to the said control means for periodically applying the said outputs to the said control means to alternately drive the microwave oscillator to the said first and second predetermined frequencies, duplexing means for connecting the microwave oscillator output to an antenna and for connecting the received reflected energy from said antenna to a mixing means, means for connecting the microwave oscillator output directly to the mixing means, and a Doppler receiver responsive to the output from said mixer for providing the velocity of the antenna along its ground track and drift angle thereof.

10. A Doppler radio navigator comprising, a microwave oscillator, control means for periodically varying the frequency of the oscillator output from a first to a second value, means responsive to said varying oscillator output for providing signals indicative of the instantaneous frequency deviations of the oscillator output from first and second predetermined reference frequencies, means responsive to the outputs indicative of the instantaneous frequency deviation of the oscillator output from the first and second predetermined frequencies and to the said control means for periodically applying the outputs from said means to the control means to alternately drive the microwave oscillator to the said first and second predetermined frequencies, duplexing means for connecting the microwave oscillator output to an antenna and for connecting the received reflected energy from said antenna to a mixing means, means for connecting the microwave oscillator output directly to the said mixing means, and a Doppler receiver responsive to the output from said mixer for providing the velocity of the antenna along its ground track and the drift angle thereof.

11. A Doppler radio navigator comprising, a microwave oscillator having an output, a voltage variable capacitance means connected to the output of said oscillator, a square-wave generator, means for applying the output of said square-wave generator to the voltage variable capacitance means for varying the capacitive reactance of said means which varies the frequency of the oscillator output from a first to a second value, means responsive to said varying oscillator output for providing signals indicative of the instantaneous frequency deviations of the oscillator output from first and second predetermined reference frequencies, means responsive to the outputs indicative of the instantaneous frequency deviations of the oscillator output from the said first and second predetermined frequencies and to the square-wave generator for periodically applying the said outputs to the said voltage variable capacitance means for driving the microwave oscillator to the said first and second predetermined frequencies, duplexing means for connecting the microwave oscillator output to an antenna and for connecting the received reflected energy from said antenna to a mixing means, means for connecting the microwave oscillator output to the said mixing means, and a Doppler receiver responsive to the output from said mixer for providing the velocity of the antenna along its ground track and drift angle thereof.

12. A Doppler radio navigator comprising, a microwave oscillator, control means for cyclically changing the frequency of the oscillator output from a first to a second value, first means responsive to said cyclically changing oscillator output for providing a signal indicative of the instantaneous frequency deviations of the oscillator output from a first predetermined reference frequency, second means responsive to said cyclically changing oscillator output for providing a signal indicative of the instantaneous frequency deviations of the oscillator output from a second predetermined reference frequency, means responsive to the output from said first and second means and to the control means for cyclically applying the outputs from said first and second means to the control means for alternately driving the microwave oscillator to the said first and second predetermined frequencies, duplexing means for connecting the oscillator output to an antenna and for connecting the received reflected energy from said antenna to a mixing means, means for connecting the microwave oscillator output to the said mixing means, and a Doppler receiver responsive to the output from said mixer for providing the velocity of the antenna along its ground track and drift angle thereof.

No references cited.